Patented July 18, 1939

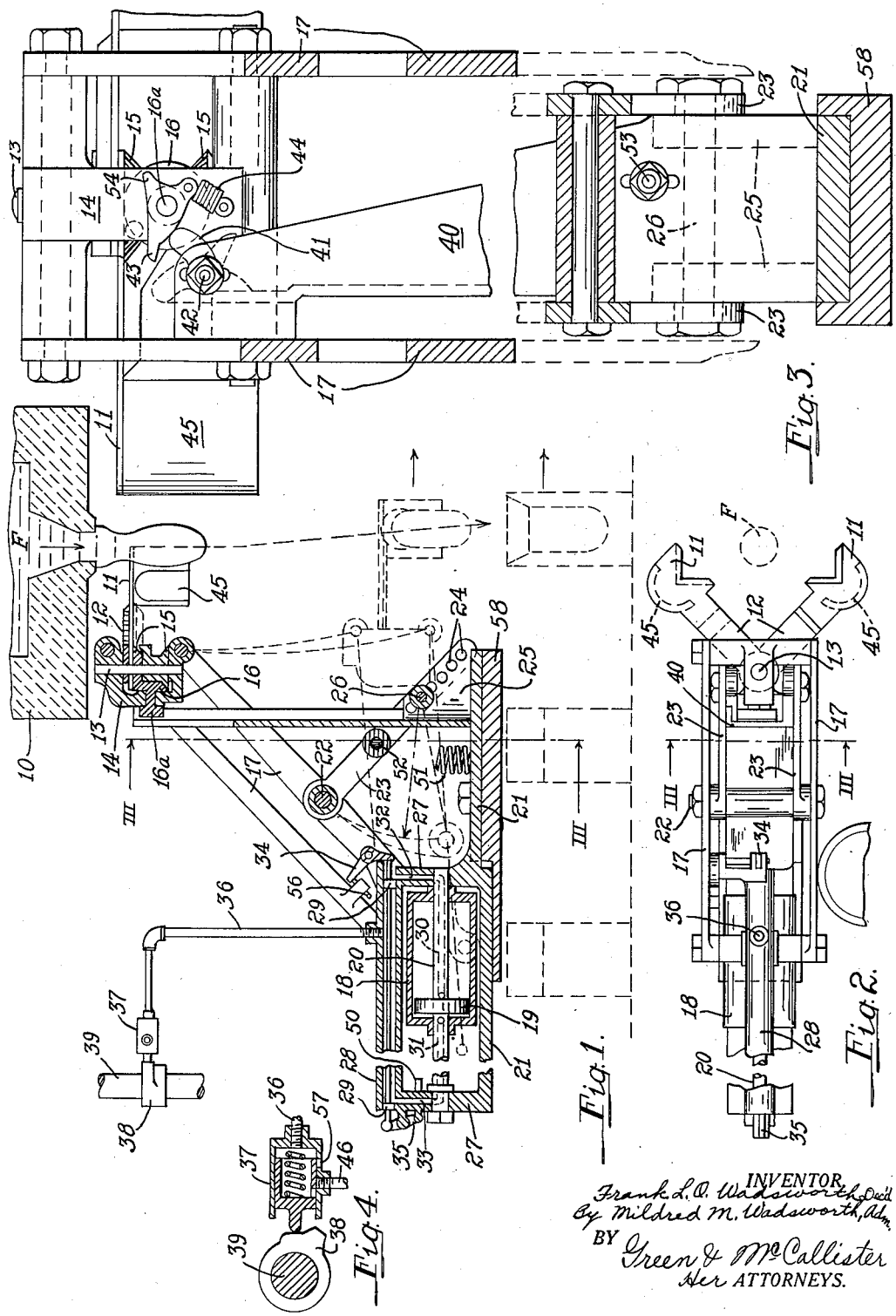

2,166,563

UNITED STATES PATENT OFFICE 2,166,563

METHOD AND APPARATUS FOR SEVERING MOLTEN GLASS

Frank L. O. Wadsworth, deceased, late of Pittsburgh, Pa., by Mildred M. Wadsworth, administratrix, Pittsburgh, Pa., assignor to Ball Brothers Company, Muncie, Ind., a corporation of Indiana Original application March 4, 1935, Serial No. 9,133. Divided and this application May 29, 1937, Serial No. 145,451

10 Claims. (Cl. 49—14)

This invention relates to the successive formation of mold charges and more particularly to a method and apparatus for severing successive mold charges from a suspended stream of molten glass, and is a division of a pending application Serial No. 9,133, filed March 4, 1935, by Frank L. O. Wadsworth, deceased.

One object of the present invention is to provide a shear mechanism which is adapted to not only sever successive mold charges from a continuously flowing stream of molten glass but also to deliver the severed charges to the parison molds of a continuously moving forming machine without the use of guide chutes or funnels, and without any danger of impinging the charge against the sides of the neck-rings or body sections of the parison molds. This object is accomplished by moving the shear blades downwardly at a substantially greater speed than that of a freely falling body, and simultaneously imparting to the shear a horizontal movement in the same direction as that of the revolving parison mold table whereby the severed charges are delivered to the receiving mold while such molds are moving at a relatively high speed, but at the instant of delivery there is no substantial lateral movement of the charge with respect to the receiving mold whereby impingement with the mold is avoided.

A further object of this invention is to provide a shear mechanism which not only severs successive mold charges from a continuously flowing stream but also delivers such severed charges to the continuously moving parisons of a forming machine at such a high velocity that the impact of the charge on the bottom of a mold will cause the charge to mushroom out against the sides of the mold and completely fill the mold cavity with a homogeneous mass of molten material, even though the diameter of the severed mold charge is substantially less than that of the receiving mold.

These and other objects which will hereinafter be made apparent to those skilled in this particular art, are accomplished by means of this invention, one embodiment of which is described in the following specification and illustrated in the accompanying drawing, wherein Figure 1 is a sectional elevation of the improved accelerated delivery shear mechanism;

Fig. 2 is a plan view of this mechanism;

Fig. 3 is an enlarged sectional view on the plane III—III of Figs. 1 and 2; and

Fig. 4 is an enlarged semi-diagrammatic view of the valve element of the pneumatically actuated shear mechanism.

Referring to the drawing, 10 represents a forehearth having an orifice F in the bottom thereof through which glass is issuing in a continuously flowing stream of regularly recurrent enlarged sections under the action of any suitable feeder mechanism (none shown). The stream flowing through the orifice F is cut into successive mold charges of the desired shape and weight by my improved shear mechanism which comprises a pair of "cat's eye" shear blades 11—11, that are adjustably mounted on arms 12—12 which are coaxially journaled on a fixed pintle bolt 13 in the head 14. These arms are operably connected by beveled gear sectors 15 and a cooperating pinion 16. The shear blade head 14 is carried by a twin pair of parallel links 17—17—17—17 that are pivotally attached at their upper ends to laterally extending bosses on the head 14 and at their opposite lower ends to a cylinder 18 which is slidably mounted on a fixed piston and piston rod elements 19—20 that are carried by a U-shaped angle plate 21. The middle points of the two opposing links 17—17 are coupled together by a spacer bolt 22 which forms a journaled bearing for the connected ends of a pair of radius guide links 23—23 and the opposite open ends of this link system are provided with a series of axially disposed apertures 24—24 which may be brought into registry with a corresponding series of holes in a triangular bracket support 25 on the inner end of the plate 21. The links 23—23 are pivotally connected to the supports 25 by passing a trunnion bolt 26 through any desired set of registered apertures (24) and thus varying at will the effective length of these radius guide arms.

Upwardly extending brackets 27 are provided at the outer end of the plate 21 which carry the ends of the piston rod 20 and which also support a valve casing 28 for a reciprocable double piston valve 29. The piston valve 29 controls the admission and exhaust of motive fluid to and through passages 30—31 in the hollow piston rod 20 which communicate with passages 32—33, respectively, formed in the brackets 27—27 and lead to the valve casing 28, and the valve 29 thus controls the admission and exhaust of motive fluid to and from the opposite ends of the cylinder 18. The piston valve 29 is moved to and fro in its casing 28 by means of tappet levers 34—35 that are pivotally mounted on the upwardly extending brackets 27. The intermediate portion of the chamber 28 for the control valve 29 is connected by a pipe 36 to the casing of a valve 37 which is actuated by a cam 38 on a vertical shaft 39 which may be driven from the forming machine or from the feeder mechanism in any suitable manner, not shown. The form of the valve 37 is shown in Fig. 4.

The triangular brackets 25 are connected on their vertical sides by an upwardly extending flange plate 40 whose upper end is flared laterally to make sliding engagement with one set of the parallel links 17. The flared end of the plate 40 carries a one-way cam dog 41 that is pivotally mounted on a vertically adjustable trunnion bolt 42. The outer end of the shaft 16a, to which the beveled pinion 16 is secured, is provided with a crank arm 43 which is adapted to be engaged and rotated by the cam dog 41 when the shear blade head 14 is moved downwardly to rotate the shaft 16a and thereby close the shear blades 11. When so closed, the blades are held in that position by a two-way spring 44 that is then moved past its dead center position by the counterclockwise rotation of the crank arm 43; and the severed mold charge which has been cut off from the flowing stream is embraced and surrounded on its upper end and sides in semi-cylindrical guard cups 45, one of which is attached to each of the blade elements 11.

The operation of the above described shear mechanism is as follows: When a parison mold (indicated in dotted lines in Fig. 1) has been brought to the proper position beneath the orifice F, the cam 38 acts to move the valve 37 to the right, thus putting the pipe 36 in communication with a conduit 46 leading to a suitable source of motive fluid such as compressed air or some other suitable medium, and allows motive fluid to pass into the casing 28 of the valve 29. At this time the valve 29 is set as shown in Fig. 1, and the motive fluid is therefore admitted through the passages 33—31, to the outer end of the cylinder 18 and acts to move it to the left or to the opposite position to that shown. This movement of the cylinder rocks the parallel link systems 17—17 downward under the guiding action of the radius links 23—23 and correspondingly depresses the shear blade carrying head 14. The first stage of this movement closes the shear blades 11, as above explained, and the continuation thereof carries the head 14 and its associated parts downward at a very rapidly accelerated speed (a characteristic feature of the particular linkage system) along a curved path indicated by the dotted lines of Fig. 1.

The degree of curvature of this path is, of course, controlled and predetermined by the adjusted length of the radius arm guides 23. This control movement imparts to the severed mold charge a downward velocity which is very substantially greater than it could acquire in a free fall through the same distance and also imparts to it a horizontal component of movement in the direction of the arrow in Fig. 1. By having this horizontal or lateral movement of the shear blades correspond in direction to the direction of movement of the molds makes it possible to deliver the charges to receiving receptacles when the latter are moving at a relatively high speed without the use of any guide chutes or funnels and without any danger of impingement of the charge against the sides of the neck ring molds or body sections of the parisons; and also makes it possible to deliver the charges at such a high velocity that their impact on the bottoms of the molds will cause them to mushroom out against the sides and completely fill the mold cavities with a dense homogeneous mass of molten material even when the diameter of the severed stream is substantially less than that of the receiving mold.

As the cylinder 18 and the link system 17—23 approach the end of their outward and downward movements, the end of the cylinder 18 engages a rod 50 associated with the lower end of the tappet lever 35 and moves the valve 29 forwardly to admit motive fluid through the passageways 32—30 to the further (inner) end of the cylinder 18 and open the opposite end thereof, i. e., passageways 31—33 to the exhaust. This reversal of the motive fluid connections first cushions and arrests and then reverses the movement of the cylinder 18 and the associated shear head members 14, etc., thus initiating the return of the parts to their initial position. In order to prevent any inertial overthrow of the downwardly moving elements 14—17—23 (which might carry the links 17—23 into or beyond an aligned or dead center position), there is provided a compression spring 51 which is seated on the plate 21 and is so positioned as to elastically engage a second cross spacer bolt 52 in the radius guide arm linkage 23—23 and assist in both checking and reversing this downward movement.

The plate 40 carries an adjustable cam pin 53 which is adapted to engage a lug 54 on the crank arm 43 and rock the latter in a counterclockwise direction as the shear head 14 approaches the limit of its delivery stroke and at approximately the same instant the tappet lever 34 is actuated to move the valve 29 to its forward position. This action opens the closed shear blades concurrently with the checking and arrest of their downward movement and the engagement of the elements 54—53 also tends to assist the spring 51 in bringing the rapidly moving parts to rest. In order to gradually check the return upward movement, the cam 38 is preferably so shaped and so adjusted on the shaft 39 that it is moved to an intermediate position (Fig. 4) at about the middle of the return stroke so as to then cut off the further flow of motive fluid through the passageways 32—30 to the further end of the cylinder 18 and permit the completion of this movement under the expansive action of the compressed air that is trapped in the cylinder and in the pipe connection 36. As the parts approach their initial position the tappet lever 34 is engaged by an adjustable screw 56 on one of the links 17 and is thus moved back to the position shown in Fig. 1. This opens the front of the cylinder 18 to atmosphere and momentarily admits a portion of the trapped fluid in the pipe 36 to the opposite end thereof, thus effecting the final arrest of the upward movement. At this stage in the operation the valve 37 is returned to its initial position, thus opening the exhaust port 57 in the valve housing 37 to atmosphere and permitting the final residue of trapped motive fluid in the valve casing 28 and line 36 to be discharged to the atmosphere. This completes one cycle of action of the shear mechanism.

The curvature of the path traversed by the shear head (and by the charge of glass enclosed by the closed shear blade and guide cups 11—45) is determined and controlled by the positioning of the pivot or trunnion bolt 26 in the line of apertures 24 and, as indicated in the dotted lines in Fig. 1, this curvature can be varied within wide limits so as to obtain any desired ratio between the downward and the lateral acceleration of the delivered charge. The base plate 21 on which the shear mechanism is mounted is itself slidably supported on a bracket 58 which is adjustably secured to a suitable supporting member such as one of the side pillars of the forming machine. By moving the bracket 58 up or down and rotating it on its pillar support and by sliding the plate 21 to and fro on the bracket 58 the shear blades can be accurately adjusted to any desired position both with respect to the delivery orifice F and with respect to the path of movement of the press molds of the forming machine.

With the foregoing disclosure as a guide, engineers and others skilled in this art will be enabled to utilize the characteristic features and operative advantages of the present invention, and it will also be apparent to such skilled persons that certain changes, omissions and additions may be made therein without departing from the spirit of the invention or the scope of the appended claims.

Further, it is desired to be understood that there have been devised various other methods and apparatus for severing a continuously flowing stream of molten glass to produce well formed mold charges and in which the shear blades move downwardly with the stream, and that such mechanisms and procedures of operation form the subject matter of and are claimed in copending applications for Letters Patent and all of which structurally and functionally distinguish from the features herein claimed.

What is claimed as new and desired to be secured by Letters Patent is:

1. A method of forming individual mold charges from a continuously flowing stream of molten glass which comprises periodically severing a charge from said stream and applying a force to said severed charge to move the same downwardly and laterally for delivery to a receiving receptacle.

2. A method of forming and delivering individual charges of molten glass to the molds of a continuously moving mold table which includes periodically severing a stream of glass at a point above said mold and applying an accelerating force to the severed charge while moving said charge laterally in the direction of travel of said mold table.

3. A method of forming and delivering successive charges of molten glass to the molds of a continuously moving table which comprises periodically moving a severing implement through a suspended stream of molten glass to sever a mold charge therefrom and utilizing said severing implement to apply an accelerating force to such severed charge while moving the same laterally in the direction of travel of said mold table.

4. A method of forming and delivering charges of molten glass to the successive molds of a continuously moving mold table, which includes periodically moving opposed shear blades into a suspended stream of molten glass to sever a charge therefrom, moving said closed shear blades downwardly and at a speed greater than that of a freely falling body while simultaneously moving said charge laterally in the direction of movement of said mold table, and then opening said shear blades and delivering said charge to a receiving mold while continuing the movement of said mold.

5. A method of forming and delivering charges of molten glass to the successive molds of a continuously moving table which includes severing a charge from a suspended stream of molten glass, enveloping said severed charge, moving said enveloped charge downwardly at a speed greater than that of a freely falling charge while simultaneously moving said charge laterally in the direction of travel of the receiving mold, releasing said charge and delivering said charge to a mold while continuing the rotation of said table.

6. A shear mechanism comprising a pair of opposed shear blades, means for moving said shear blades downwardly and laterally, and means responsive to initial downward movement of said blades for closing the same.

7. A shear mechanism, comprising a pair of opposed shear blades, a head carrying said blades, means for moving said head downwardly, means responsive to the downward movement of said head for closing said blades, means for moving said head horizontally during the downward movement thereof, and means for opening said blades at the end of the downward movement of said head.

8. A shear mechanism comprising a pair of opposed shear blades, a head carrying said blades, a linkage support for said head, radius guide links journaled to said linkage support, a cylinder connected to said linkage support, and means for moving said cylinder to swing said linkage support about said radius guide links and move said head downwardly and horizontally.

9. A shear mechanism comprising a pair of opposed shear blades, a head carrying said blades, links supporting said head, a movable cylinder connected to said links, radius guide links connected to said first mentioned links, means for moving said cylinder in opposite directions to move said head downwardly and horizontally and then to return said head to its initial position, and means for closing said blades at the beginning of the downward movement of said head.

10. A shear mechanism comprising a pair of opposed shear blades, a head carrying said blades, a movable cylinder, links journaled to said head and said cylinder, pivoted radius arms journaled to the middle of said links, means for moving said cylinder in opposite directions, means for opening and closing said blades, and means for varying the length of said radius guide arms.

MILDRED M. WADSWORTH.
*Administratrix of the Estate of Frank L. O. Wadsworth, Deceased.*